Jan. 27, 1959  R. H. DEITRICKSON  2,870,749
CONTROL VALVE FOR FLUID OPERATED ENGINES FOR DOWN WELL PUMPS
Original Filed Oct. 25, 1955  11 Sheets-Sheet 1

LEGEND
POWER FLUID
EXHAUST FLUID
PRODUCTION FLUID

INVENTOR.
Roy H. Deitrickson
BY Owen + Owen
ATTORNEYS

Jan. 27, 1959     R. H. DEITRICKSON     2,870,749
CONTROL VALVE FOR FLUID OPERATED ENGINES FOR DOWN WELL PUMPS
Original Filed Oct. 25, 1955     11 Sheets-Sheet 3

FIG. 6

INVENTOR.
Roy H. Deitrickson
BY Owen + Owen
ATTORNEYS

United States Patent Office 2,870,749
Patented Jan. 27, 1959

2,870,749

CONTROL VALVE FOR FLUID OPERATED ENGINES FOR DOWN WELL PUMPS

Roy H. Deitrickson, Toledo, Ohio, assignor, by mesne assignments, to The National Supply Company, Pittsburgh, Pa., a corporation of Ohio Application April 18, 1957, Serial No. 653,622

23 Claims. (Cl. 121—150)

This invention relates to an improvement in control valves for fluid operated engines employed in down well pumps.

This application is a continuation-in-part of my copending application Serial No. 542,582, filed October 25, 1955, now abandoned.

The invention consists of a pressure actuated valve of the same general type as that shown in my United States Letters Patent No. 2,682,257, issued June 19, 1954 and, like the valve in that patent, a control valve embodying the invention takes advantage of changes in the pressure of the engine motivating fluid which occur near the top and bottom of the strokes of the engine piston to cause reversal of the direction of movement of the engine piston by shifting the control valve in response to such changes in pressure.

While the valve of my issued patent functions in general according to the preceding description and has the advantages and desirable operating features set forth therein, the control valve of the present invention has a further improvement relative to my patented valve which results from the elimination in the present invention of certain complex parts and subassemblies which are difficult to manufacture and assemble.

It is, therefore, the principal object of this invention to provide a control valve for a fluid operated engine which is responsive to pressure variations caused by changes in the speed and position of the engine piston for throttling and reversing the fluid connections to, and thus the movement of, the engine piston.

It is another object of this invention to provide a control valve for a fluid actuated engine of the type having a differential area between its upper and lower faces so that one face of the engine piston is exposed to high pressure fluid at all times and the other face of the piston is alternately exposed to high and low pressure fluid for reversal of movement of the piston, the valve acting in response to changes in pressure occasioned by approach of the piston to the limits of its stroke to alternately apply high and low pressure fluid to this second face of the engine piston.

It is yet another object of this invention to provide a control valve for a fluid actuated engine comprising a floating throttling valve responsive to changes in pressure of the fluid acting on one face of the engine piston during the movement of the engine piston between its extreme positions for maintaining a substantially uniform speed of movement of the engine piston even in the face of changing load conditions.

Although the valve embodying the present invention will be described in the following specification in its application as a control valve for a fluid actuated downwell pump and is illustrated as constituting a separate unit attached to the upper end of the engine cylinder of such a pump, neither its function nor its position is so limited. The valve must, of course, be in communication with a source of fluid and with the enclosure to which the fluid is to be directed in one valve position. In the embodiment of the invention disclosed for controlling a downwell pump, this enclosure is one end of the engine cylinder.

It is a broad object of the instant invention to provide an automatic alternate position valve, generally of the "three-way type," to control the feeding of hydraulic fluid to one or more consumers wherein the valve position is automatically shifted in response to changing characteristics in the flow to one consumer.

As used in the following specification and in the claims, the term "hydraulic force" covers the summation of hydraulic forces acting at any given time in any one direction. The hydraulic force can be created in either of two ways: first, by exposing equal areas to different and to oppositely acting pressures; secondly by exposing different areas to the same pressures. It should also be noted that, as used in the following expression, the terms "up" and "down," and other forms thereof such as "upwardly," "downwardly," "upstroke" and "downstroke" relate to the orientation of the embodiments described and are not limitations either upon the positions of other embodiments of the invention or to be interpreted as limiting the invention to such positions or directions.

The foregoing brief description of the invention and some of its objects will be better understood by reference to the specification below and to the drawings, in which—

ENGINE CONSTRUCTION

Figures 1, 2:
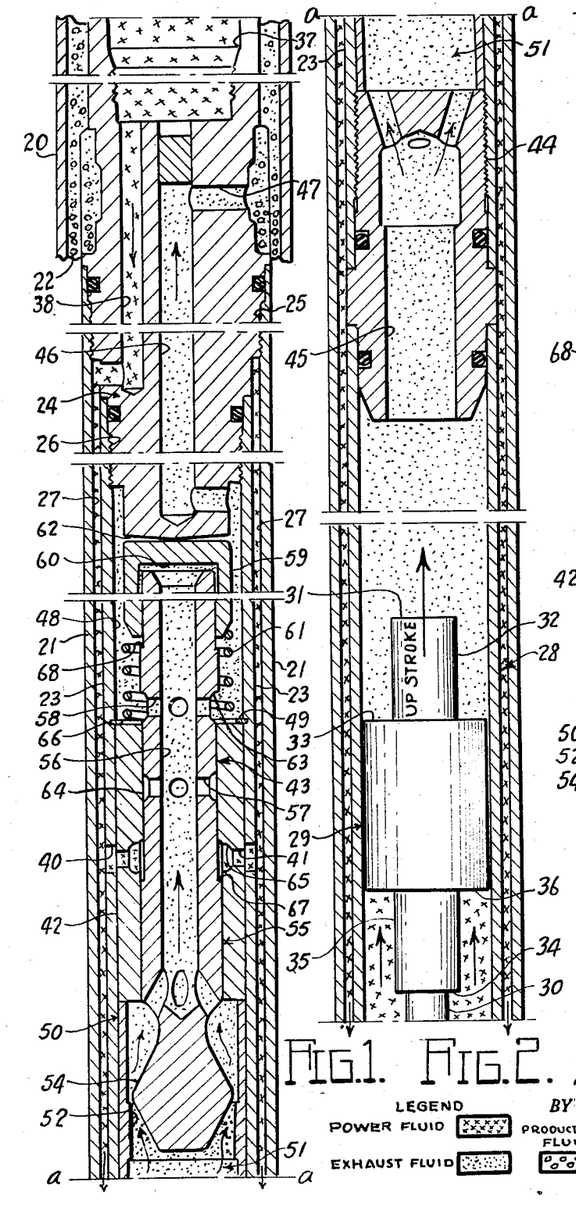
Fig. 1 is a vertical sectional view of the upper end of a fluid engine for a downwell pump and particularly of one embodiment of pressure controlled valving mechanism embodying the invention; the parts being shown in the position occupied during an up stroke of the engine piston.
Fig. 2 is a vertical sectional view of the lower end of a fluid engine including the engine piston and its cylinder, the view being a continuation of Fig. 1 and depicting that portion of the engine next below the portion shown in Fig. 1.

A control valve embodying the invention is intended to be employed with a fluid actuated engine for a downwell pump of the general type that is at or near the bottom of a well casing fragmentarily indicated in Fig. 1 by the reference numeral 20. The casing 20 is shown in Fig. 1 only but it is to be understood throughout the description of the figures that the entire pump mechanism including its own engine casing 21 is located within the continuous well casing or tubing 20. In illustrating the engine of the downwell pump it will be assumed that the pump itself is of the type well known in the art which discharges its production fluid, i. e., the crude oil drawn from the formation, into the annular space generally indicated at 22 in Fig. 1 exteriorly of the engine casing 21 and interiorly of the well casing or tubing 20. The annular space 22 extends from the exterior of the pump at the bottom of the casing to the surface and the production fluid as well as discharged engine actuating fluid is carried to the surface in the annular space 22, sometimes called the "production annulus."

A downwell pump of this general type has an engine casing 21 inside of which there is located a valve jacket 23, the upper end of which is closed by an upper cross head block generally indicated at 24, the cross head block 24 being threaded into the upper ends of both the engine casing 21 and the valve jacket 23 at the places indicated by the reference characters 25 and 26, respectively in Fig. 1. The valve jacket 23 has an outer diameter less than the inner diameter of the engine casing 21 which leaves a power fluid annulus 27 extending the length of the exterior of the valve jacket 23 and the length of the exterior of an engine cylinder 28 (Fig. 2) of the same diameter as the valve jacket 23 but extending downwardly below the valve jacket 23 and forming a cylinder for an engine piston generally indicated at 29 in Fig. 2.

The engine piston 29 is connected by a piston rod 30 (Fig. 2) to a pump piston, not shown in the drawings, but connected to the engine piston 29 and operating in the manner similar to the engine and pump pistons shown in my Patent No. 2,682,257. It will be observed in Fig. 2 that because of the presence of the connecting rod 30 which extends downwardly out through the bottom of the engine cylinder (see Fig. 7) the sum of the areas on the upper surface 31 of a cylindrical tenon 32 on the top of the piston 29 and an annular shoulder 33 on the piston 29 is greater than the sum of the areas on a shoulder 34 on the lower end of a lower tenon 35 on the piston 29 and an annular area 36 of the bottom side of the piston 29. In summary this may be phrased: Area 31+area 33 is greater than area 34+area 36. As a result, when both faces of the piston 29 are exposed to fluid of the same pressure the piston is thrust downwardly. This differential area is relied upon to produce down strokes of the engine piston and thus down strokes of the pump piston connected thereto by the rod 30. In an engine of this type it is necessary, therefore, only to valve the engine cylinder 28 above the piston 29 to both high and low pressure lines leaving the engine cylinder 28 below the piston 29 permanently connected to the high pressure actuating fluid.

High pressure actuating fluid is led downwardly from the surface to an engine of the type being discussed through a string of high pressure macaroni connected to a high pressure socket 37 (Fig. 1) at the top of the upper cross head block 24. The socket 37 connects through a plurality of passageways 38 with the power annulus 27 to lead power fluid down the exterior of the valve jacket 23 to the bottom of the engine cylinder 28 (Fig. 7) and through a plurality of radial passageways 39 into the engine cylinder 28 beneath the engine piston 29. Power fluid may also be admitted into the interior of the valve jacket 23 through a plurality of radial ports 40 (Fig. 1) which register with radial ports 41 in a tubular valve liner 42, depending upon the position of a spool valve generally indicated at 43.

Figure 5:
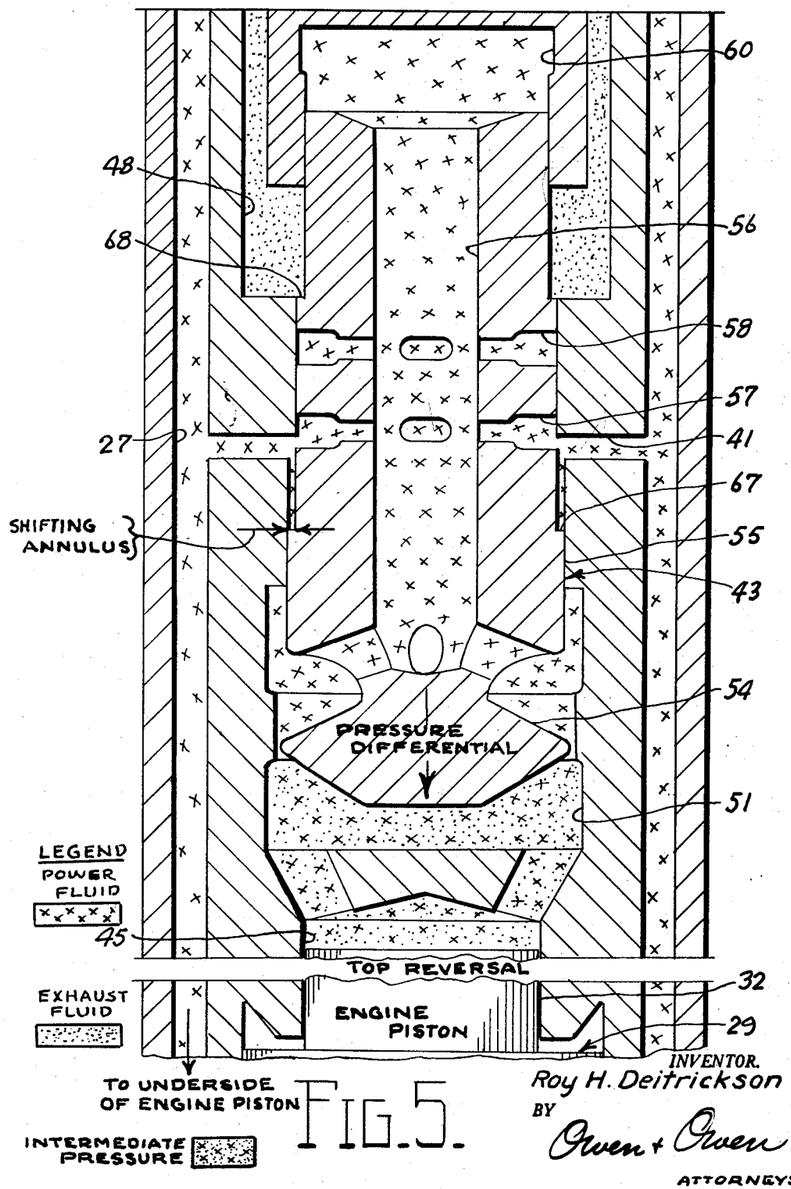
Fig. 5 is a view similar to Fig. 4 but showing the parts of a control valve embodying the invention in the position occupied at about the time of a top reversal or change of direction of movement of the engine piston at the top of its stroke.

The lower end of the valve jacket 23 is threaded onto the exterior of a socketed plug 44 (Fig. 2) which also delineates the upper end of the engine cylinder 28 and is counterbored forming an upper dashpot 45 which receives the tenon 32 on the upper end of the engine piston 29 when the engine piston 29 reaches the top of its stroke (Fig. 5).

The upper cross head block 24 also connects the production annulus 22 through a center bore 46 and a plurality of radial passageways 47 to an upper valve chamber 48 interiorly of the valve jacket 23 and above the valve liner 42.

VALVE CONSTRUCTION

The valve liner 42 is positioned in the valve jacket 23 at its upper end by a retaining ring 49 set upon a suitable groove in the interior of the valve jacket 23 and axially abuts the upper end of a valve restrictor sleeve 50 (Fig. 1) which rests on the upper surface of the plug 44 defining a lower valve chamber 51. The valve restrictor sleeve 50 has a vertically extending annular land 52 which cooperates with a bulbous spool valve head 54 integrally mounted on the lower end of a spool valve body 55. The spool valve body 55 is axially bored to form a continuous vertical passageway 56 opening into the upper valve pocket 51 at its lower end and intersected by two spaced sets of radial ports 57 and 58.

The upper end of the spool valve body 55 extends into a guide cylinder 59, having a relatively snug sliding fit therein, the two forming a valve stem pocket 60. The guide 59 is thrust upwardly by a coil retaining spring 61 against the spherical lower end 62 of the upper cross head block 24. The freedom of movement provided by the retaining spring 61 thrusting the cylinder 59 against the spherical end 62 permits some lateral play in the vertical movement of the spool valve body 55. If the cylinder 59 were formed integrally with the lower end of the upper cross head block 24, for example, since the upper end of the spool valve body 55 slides into and out of the cylinder 59, all of these cooperating parts would have to be machined and assembled with great accuracy. Since the upper cross head block 24 is threaded into the upper end of the valve jacket 23 it would be almost impossible to maintain a socket in the lower end of the cross head block 24 close enough to perfect concentricity with the valve liner 42 to permit this action.

It should be observed in Fig. 1 that the vertical distance between the upper edge of an annular groove 63 that is intersected by the radial ports 58 and the lower edge of a similar annular groove 64 intersected by the ports 57 is less than the vertical distance between the upper edge of an annular groove 65 in the valve liner 42 that is intersected by the passageways 41 and a shoulder 66 on the upper end of the valve liner 42. Thus only one of the sets of ports 57 and 58 can be placed in registry with the high pressure ports 41 or the upper valve chamber 48, respectively, at a time.

The maximum diameter of the bulbous spool head 54 is slightly less than the minimum diameter of the land 52 in the valve restrictor sleeve 50. The bulbous spool head 54 tapers in both directions away from this surface of maximum diameter.

The construction just described provides a variable restriction (between the head 54 and land 52) to the flow of fluid to the upper end of the engine cylinder 28 and the pressure drop through the restriction provides the second hydraulic force for holding the valve body 55 in this first, lower position. Although the restriction in this embodiment of the invention is variable, in order to provide for automatic balancing of fluid flow and pressure as will be described below, variability is not necessary. The restriction may be of fixed size and need only be of such size that fluid flow at a rate above a predetermined rate causes a sufficient pressure drop across the restriction so that the second hydraulic force overcomes the first biasing force and holds the valve in its first position. Similarly, the particular location of the restriction is not critical. It need only be in the fluid flow path and effect some portion of the shiftable valve body 55 either directly, as where the valve body 55 itself constitutes part of the structure forming the restriction, or indirectly.

Figure 14:
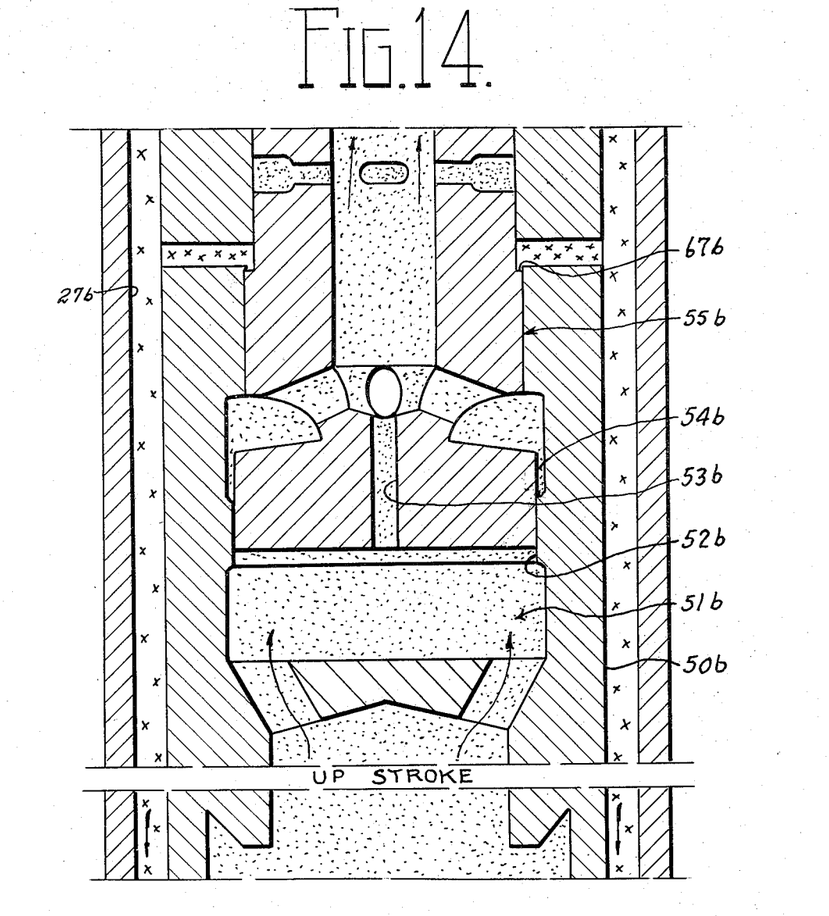
Fig. 14 is a view similar to Fig. 4 but illustrating a modification of the structure embodying the invention.

In the embodiment illustrated in Figs. 1–7, the annular space between the periphery of the head 54 and the land 52 constitutes the restriction. The pressure drop around the head 54 creates the second hydraulic force for holding the valve body 55 in position (see Fig. 6). If the further improvement of variability is not desired, the restriction can be formed by drilling a passage 53b (Fig. 14) of suitable size axially through the head 54b (in place of the angular openings shown as leading from the central passageway 56 in Figs. 1–7) to the lower valve chamber 51b. In this variation, a head 54b is cylindrical and has sliding contact with a cylindrical land 52b on the inner wall of the sleeve 50b.

VALVE OPERATION

Up stroke

Figure 4:
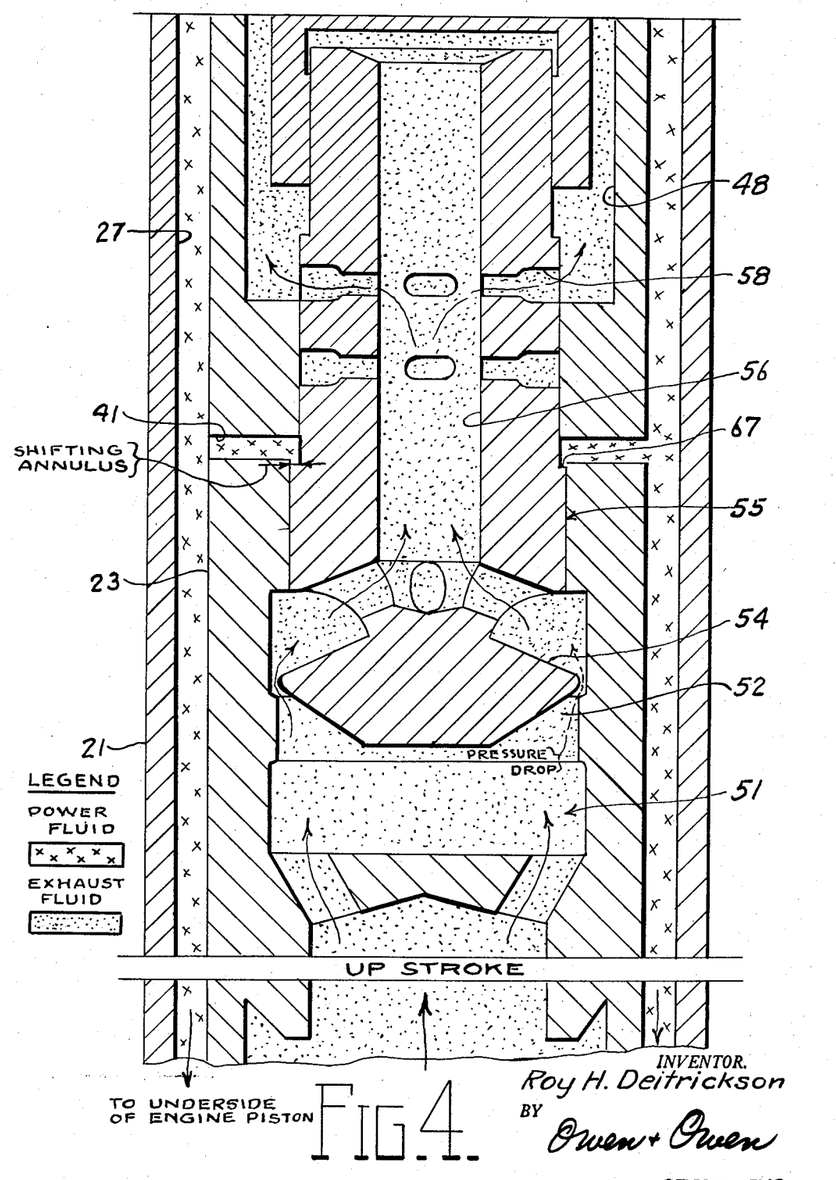
Fig. 4 is a diagrammatic, vertical sectional view of that portion of the mechanism shown in Fig. 3 with the diameters of the various parts enlarged and their vertical dimensions diminished and illustrating the position of the parts during an up stroke of the engine piston.

Referring now to Figs. 1, 2 and 4 which illustrates the position of the valve embodying the invention and the engine piston 29 during an up stroke of the engine piston 29, the operation of the control valve embodying the invention will be described. In Figs. 1 and 4 the spool valve 55 is shown in its nearly uppermost position in which the radial ports 58 are completely open to the upper valve pocket 48 and thus the vertical passageway 56 through the spool valve 55, the lower valve pocket 51 and the engine cylinder above the engine piston 29 are in communication with the low pressure exhaust and production fluid annulus 22. Since the space in the engine cylinder 28 beneath the piston 29 is continuously in communication through the power annulus 27 with the power fluid line from the surface, high pressure power fluid is fed into the engine cylinder 28 beneath the piston 29. Even though the bottom area of the piston 29 is less than its top area (summation above) the considerable difference in the pressures of the power fluid and the production fluid drives the piston 29 upwardly. The low pressure fluid above the piston 29 escapes through the path described as the piston 29 moves upwardly.

It will be observed more clearly in Fig. 4 that even though the lower valve pocket 51 and the space in the engine cylinder 28 above the piston 29 are in communication with the exhaust annulus 22, an annular shoulder 67 formed by a reduction in the diameter of the spool valve body 55 is exposed to high pressure fluid in the radial ports 41 and 40 in the valve liner 42 and valve jacket 23. The high pressure fluid acting on the shoulder 67 creates a first hydraulic force biasing the valve body 55 downwardly. Its action, therefore, tends to thrust the valve body 55 down out of the position illustrated in Fig. 4 and there is no other high pressure area on the spool valve 43 or its bulbous spool head 54 during the up stroke of the engine piston. The first downward biasing force exerted on the shifting annulus 67 is overcome, however, by a second hydraulic force created by a pressure drop across the restriction formed by the section of maximum diameter of the spool head 54 (through an annular opening formed by the spool head 54) and the restrictor land 52. This second hydraulic force is sufficient to hold the spool valve body 55 in its upper position as shown in Figs. 1 and 4.

Power fluid continues to flow down the power fluid annulus 27 and exhaust fluid continues to be forced out of the engine cylinder 28 through the passageway 56, radial ports 58 and upper valve pocket 48 to the exhaust annular passageway 22. As long as a substantial flow continues through the annular restriction around the head 54 the second holding hydraulic force holds the body 55 in position against the first biasing hydraulic force.

Top reversal

As the piston 29 approaches the upper limit of its stroke (Fig. 5) the upper tenon 32 enters the dashpot 45 which greatly restricts the escape passage through the dashpot 45 for the remaining quantity of fluid in the engine cylinder 28 above the engine piston 29. The reduction of flow of exhaust fluid out of the lower valve pocket 51 through the restriction past the spool valve head 54, reduces the hydraulic force resulting from the pressure drop around the head 54, so that the biasing force created by the high pressure fluid acting on the shifting annulus 67, thrusts the spool valve body 55 downwardly. At the same time the pressure of the fluid in the lower valve pocket 51 is raised to an intermediate value and, almost immediately after the spool body 55 starts downwardly and closes the radial ports 58, the lower radial ports 57 are opened to the high pressure ports 41 from the power fluid annulus 27 and high pressure oil enters the interior passageway 56 of the spool valve 43 and the lower valve chamber 51 above the bulbous head 54. High pressure fluid completely fills the lower valve chamber 51, the passageway 56 and the upper valve stem pocket 60 and the only portion of the spool valve body 55 which is not exposed to high pressure fluid, is a second upper annular shoulder 68 which is still exposed in the upper valve chamber 48 to the lower pressure of the production and exhaust fluid permanently in that chamber. The sum of the forces acting on the spool valve body 54 is thus balanced out except for the difference between the low pressure acting on the annular shoulder 68 and high pressure fluid acting on a similar annular area on the undersurface of the bulbous spool valve head 54. This net resolution results in a slightly upward hydraulic force acting upon the spool valve body 55 to bias it upwardly. This force is overcome by a second holding force resulting from the flow of fluid which now flows downwardly through the restriction formed by the head 54 and the restrictor land 52 (see Fig. 6) and creates the second hydraulic holding force.

Down stroke

Figure 3:
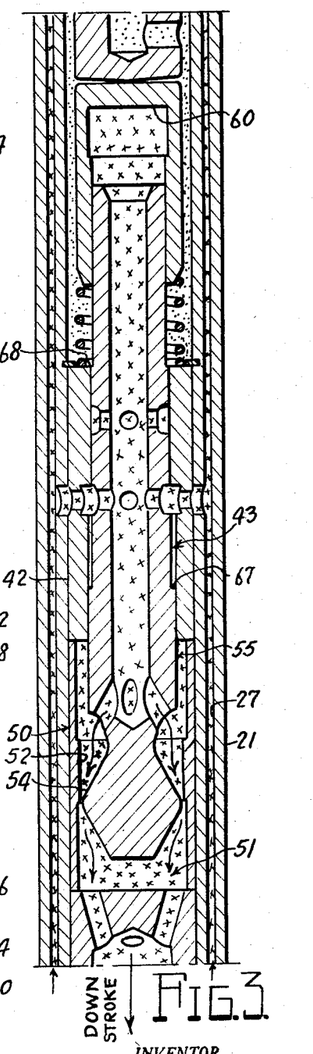
Fig. 3 is a view similar to Fig. 1 and including a portion of the structure shown at the top of Fig. 2, but illustrating the moving parts in the position occupied during a down stroke of the engine piston.
Figure 6:
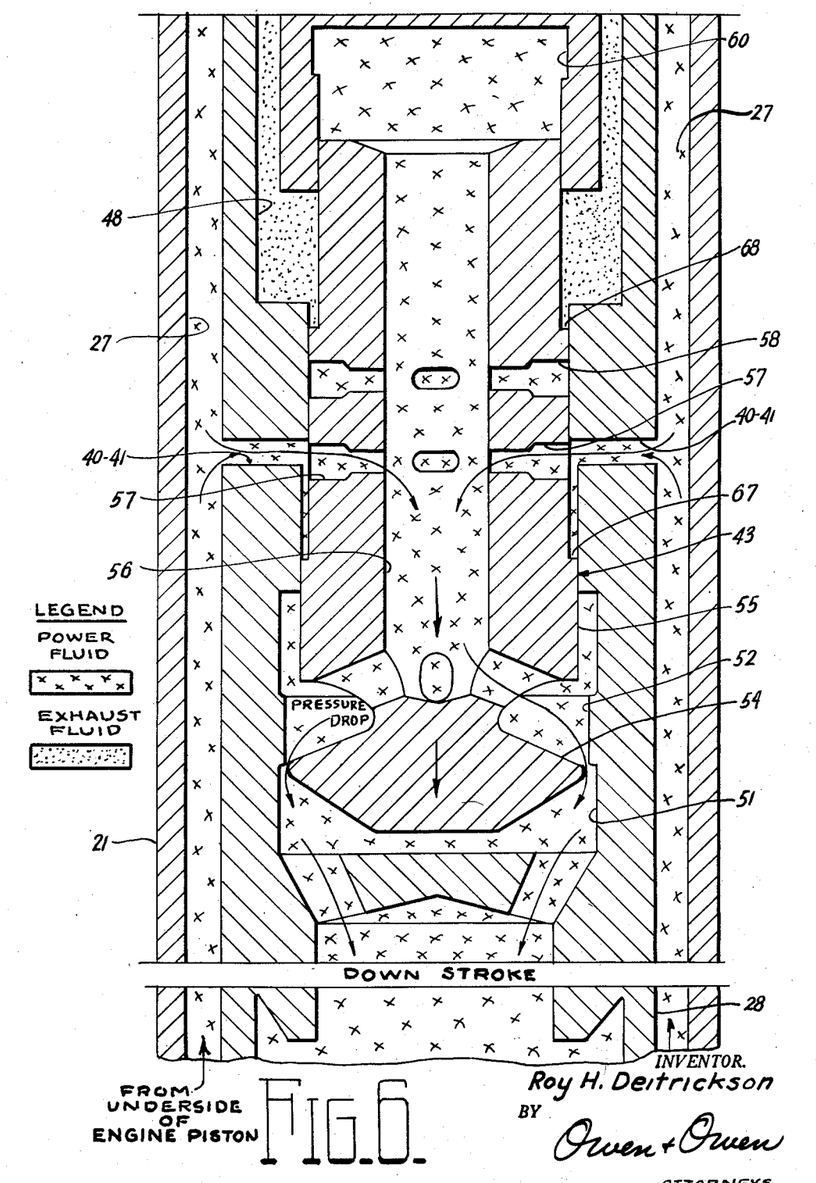
Fig. 6 is a view similar to Figs. 4 and 5 but illustrating the parts in their position for a down stroke of the engine piston.

With the spool valve 43 having been shifted to its lower position as illustrated in Figs. 6 and 3, the flow of fluid downwardly through the restriction around its bulbous head 54 counteracts the biasing force caused by the pressure differential on the annulus 68 and tending to move the spool valve body 55 upwardly. The holding force created by the restriction overcomes the biasing force and valve body 55 remains down in its lower position during the down stroke of the engine piston 29 as long as more than a predetermined flow of liquid to the engine cylinder 28 continues. Power fluid from the power fluid annulus 27 flows inwardly through the ports 40, 41 and through the ports 57 into the center passageway 56 in the valve body 55, through the restriction around its bulbous head 54, through the lower valve chamber 51 and into the upper end of the engine cylinder 28 above the engine piston 29. This forces the engine piston 29 downwardly even though the space in the engine cylinder 28 beneath the piston 29 is also exposed to high pressure operating fluid because of the differential area between the upper and lower faces of the piston 29. As the piston 29 moves downwardly, high pressure fluid beneath the piston 29 is discharged radially outwardly through the passageways 39, Fig. 7 (not shown in Figs. 3 and 6) and upwardly through the power fluid annulus 27, being displaced from beneath the engine piston 29 to above the engine piston 29. During each down stroke of the engine piston 29 a volume of power fluid equal to the volume of the piston rod 30 in the engine cylinder 28 beneath the piston 29 must be added from the power fluid source to effectuate the down stroke. The remainder of the volume in the engine cylinder 28 above the piston 29 is supplied by power fluid displaced from beneath the engine piston 29.

Except for its movement reflecting gassing conditions and/or other fluctuations in load or pressure, the spool valve body 55 is held in its lower position shown in Figs. 3 and 6 by the second hydraulic force created by the restriction and until the engine piston 29 approaches the lowermost end of its travel and the tenon 35 enters a lower dashpot 69 (Fig. 7) at the bottom of the engine cylinder 28.

*Bottom reversal*

Figure 7:
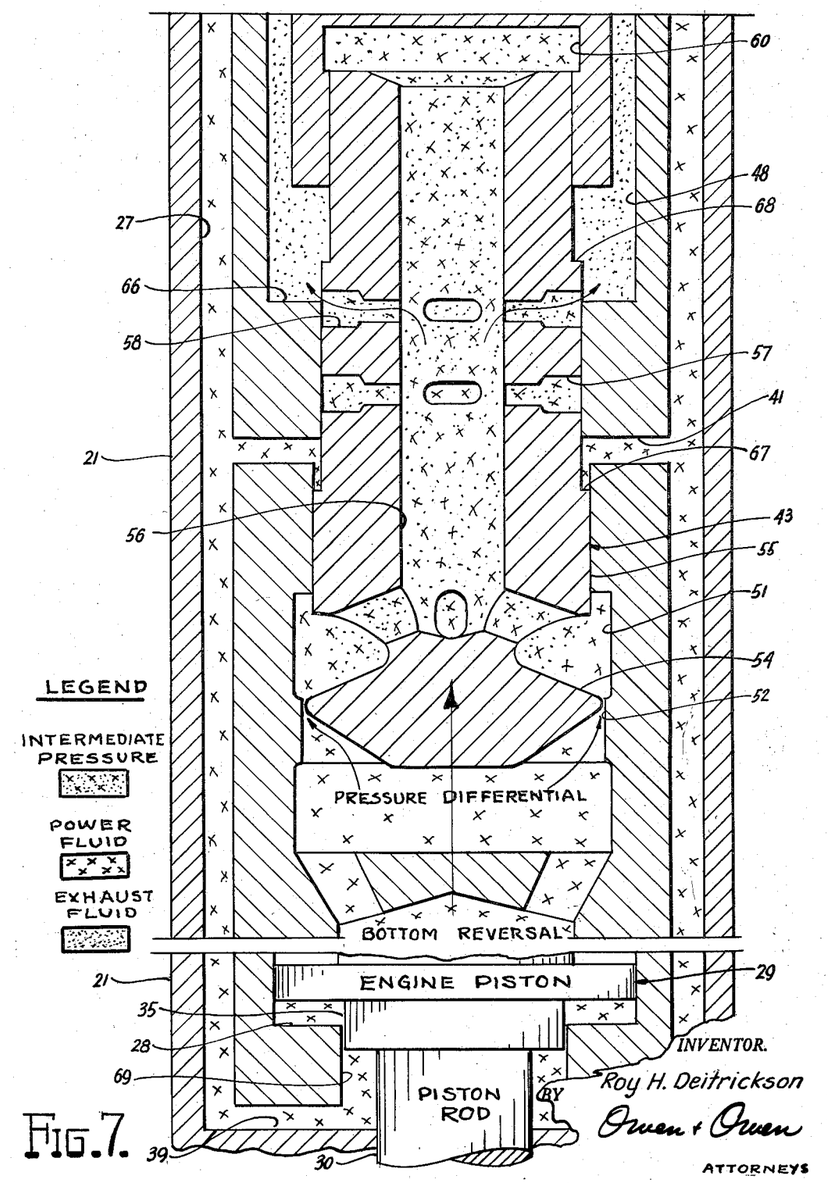
Fig. 7 is a view similar to Figs. 4, 5 and 6 but illustrating the parts of the control valve embodying the invention in the position occupied during a bottom reversal of the engine piston and also showing the engine piston at such position.

As is shown in Fig. 7, when the tenon 35 enters the dashpot 69 the only escape passage for the fluid beneath the engine piston 29 is the small annular space between the tenon 35 and the inner wall of the dashpot 69. Limiting the escape of this fluid acts to slow down the movement of the engine piston 29 downwardly and to increase the pressure in the engine cylinder 28 above the piston 29. Slowing down the downward movement of the engine piston 29 also reduces the flow of fluid downwardly through the restriction around the spool valve head 54 and the second hydraulic holding force created by the pressure drop through the restriction and acting to hold the spool valve body 55 down, no longer exists. It should be noted, at this point, that other means for reducing the flow of fluid through the restriction could also be employed. As a variation, for example, a member carried by the engine piston 29 might act to reduce the flow of fluid as by gradually closing the power fluid ports 40 or 41. High pressure now acts over the entire undersurface of the head 54 and since lower exhaust pressure is present on the annulus 68, the sum of the biasing hydraulic forces on the spool valve body 55 is upward in direction and the spool valve body 55 is moved upwardly. As the valve body 55 moves upwardly to the position illustrated in Fig. 7, the ports 58 pass the upper shoulder 66 of the valve liner 42. The internal passageway 56 of the spool valve body 55 and thus the lower valve chamber 51 and the space in the engine cylinder 28 above the piston 29 are vented to the upper valve chamber 48 so that the pressure above the engine piston 29 drops immediately to an intermediate pressure as shown in Fig. 7 and then, as the valve body 55 continues to move upwardly to its "up stroke" position, the pressure in the system above the engine piston 29 falls to the exhaust pressure and the valve reaches the position illustrated in Fig. 1 to commence an up stroke of the engine piston 29.

*Gassing conditions*

When, as frequently occurs, there is gas present in the formation, the single action pump driven by the engine controlled by the valve of the invention draws gas into the pump cylinder beneath the pump piston on an up stroke. On the next down stroke of the pump piston under such conditions the gas is merely compressed and does not exert sufficient lift against the travelling valve in the pump piston to raise that valve off its seat. As a result the entire weight of the column of the production fluid extending above the pump piston is supported by the pump piston. The weight of this column of production fluid is added to the force acting to move the pump piston downwardly and the engine piston races.

In a pump operated under control of a control valve embodying the invention when gas is present beneath the pump piston and the engine piston tends to speed up because of the mentioned load on the pump piston, the rate of flow of fluid around the spool valve head 54 increases because of the reduced pressure beneath the head 54. Whenever the rate of flow of fluid around the head 54 increases and also because of the reduced pressure beneath the head 54, the pressure drop across the annular orifice between the head 54 and the land 52 also increases and this increase in pressure differential moves the valve head 54 and the spool valve 43 downwardly.

When the valve 43 moves downwardly it throttles the high pressure ports 40—41 which reduces the rate of flow of the power fluid from the power fluid annulus 27 into the interior passageway 56. Reduction of flow of the high pressure fluid into the interior of the valve body 55 compensatingly reduces the quantity of the fluid flowing around the bulbous head 54 and the input flow of high pressure power fluid to the upper end of the engine cylinder 28 and slowing the downward movement of the engine piston 29.

*Sand in pump*

It frequently happens that fine sand from the formation enters the pump. Any such sand which enters the pump cylinder tends to work into the close space between the pump piston and the inner wall of the pump cylinder and its presence, of course, makes the pump piston stick or bind. When this occurs in a pump having a fixed length of stroke through which the pump piston must travel before its control valve can be actuated (for example, garbutt rod controls) the pump piston is stopped by the binding before it has traveled far enough to actuate the valve, which locks up the pump and causes serious damage.

In a pump controlled by a control valve embodying the invention no damage occurs to the pump mechanism or to the engine mechanism when sand enters the pump. For example, if sand enters the pump during an up stroke (Fig. 4) the presence of the sand retards the movement of the pump piston. This stops the movement of the engine piston 29 and decreases the rate of flow of exhaust fluid around the bulbous head 54. This drop in rate of flow reduces the pressure drop around the bulbous head 54 so that the high pressure fluid present on the shifting annulus or annular shoulder 67 comes into play and thrusts the spool valve 43 downwardly, reversing the movement of the engine piston by admitting high pressure fluid into the system as in Fig. 6 to produce a down stroke carrying the pump piston away from the sand.

Similarly, if sand enters the pump cylinder during a down stroke (Fig. 6) the movement of the piston downwardly stops. This increases the pressure above the engine piston 29 and thus in the system controlled by the spool valve 43 and equalizes the pressure on both sides of the bulbous head 54 so that extremely high pressure is acting on the underside of the bulbous head 54 over the annular area corresponding to the annular shoulder 68 which remains exposed only to the low exhaust pressure. The net balance of forces present on the spool valve body 55 is thus in an upward direction and the spool valve 43 is moved upwardly, as at a bottom reversal, to the up stroke position of Fig. 4.

SUMMARY OF VALVE OPERATION

From the preceding description of the operation of the valve particularly under the headings "Top Reversal," "Bottom Reversal," "Gassing" and "Sand," its operation will be seen to be controlled by the balancing and unbalancing of the biasing hydraulic force which results from exposure of equal valve body areas to different pressures or different valve body areas to the same pressures, against a holding hydraulic created at the flow restriction. Decreases in the flow of fluid through the restriction below a certain level reduce the second holding force to a point such that the biasing force causes the valve body to shift. In addition, because the restriction in the illustrated embodiment of the invention is variable, minor increases or decreases in the rate of flow produce corresponding fluctuations of the position of the valve body 55 which throttle or open the flow of fluid through the passageways 57 and 58. It therefore follows that any change in the rate of flow through the restriction and compensating change in the second holding hydraulic force, whether brought about by actual changes in the load on the pump piston or artificial changes in the load resulting from approach to the ends of strokes, results in an automatic shift of the control valve to produce a correct change of movement of the engine piston 29.

*Modification two*

The modification of the invention illustrated in Figs. 8–13 primarily consists of changes in the valve restrictor sleeve and in the provision of fluid metering means at the upper end of the valve spool body. In describing the embodiment of the invention in these figures, therefore, like numerals having the suffix "*a*" will be given to parts in Figs. 8–13 which are identical to parts in Figs. 1–7 and new reference numerals to those parts which are different in structure or function.

Figures 8, 9:
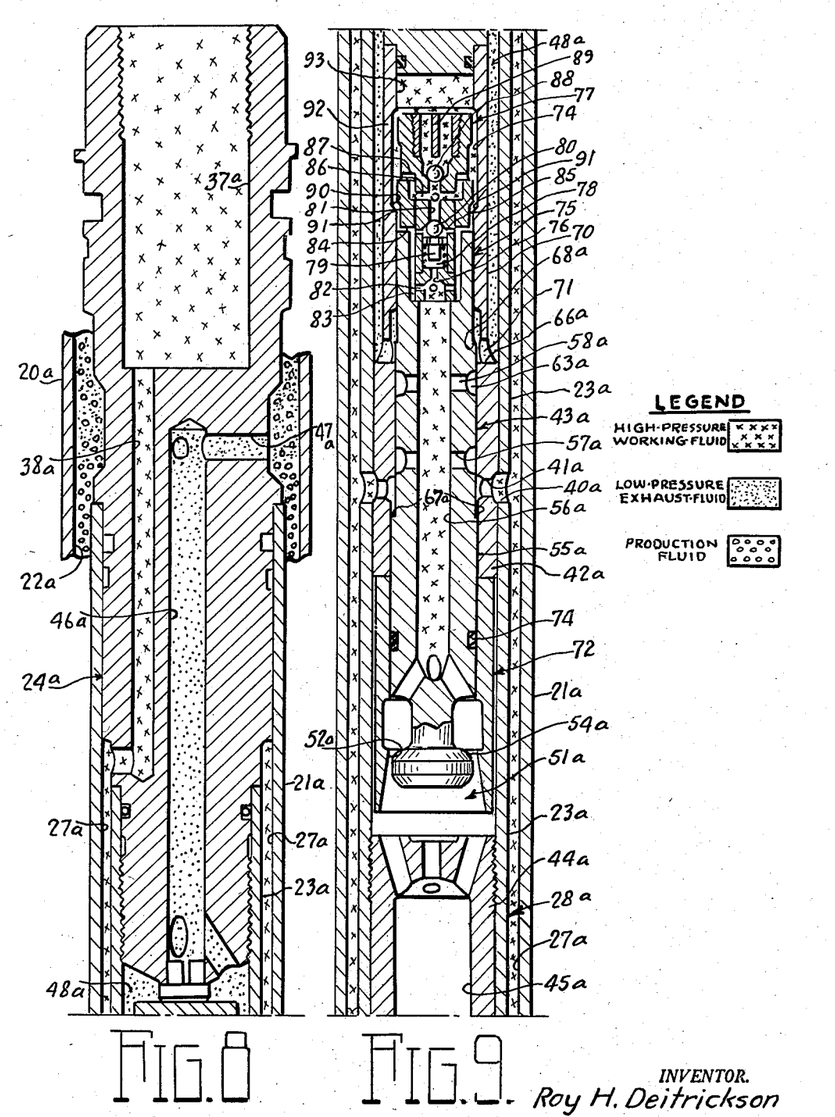
Figs. 8 and 9 are vertical sectional views similar in their relationship to the relationship of Figs. 1 and 2 and particularly illustrating a modified form of control valve embodying the invention, the parts being shown in the positions just after a bottom reversal of the engine piston and before the start of an up stroke thereof.

In common with the modification of the invention illustrated in Figs. 1–7, the embodiment of the invention illustrated in Figs. 8 and 9 has an upper cross head block 24a which is threaded into the upper end of a valve jacket 23a and into the upper end of a larger engine casing 21a. The cross head block 24a has a high pressure socket 37a at its upper end which communicates through a passageway 38a with a high pressure annulus 27a between the engine cylinder 21a and valve jacket 23a. The upper cross head block 24a also has a center bore 46a communicating through radial passageways 47a with a production fluid annulus 22a between the exterior of the engine casing 21a and the well casing 20a only fragmentarily shown in Fig. 8.

At its lower end the center bore 46a communicates with an upper valve chamber 48a. In this embodiment of the invention the upper valve chamber 48a is formed between the interior of the valve jacket 23a and the exterior of a tubular valve stem cylinder 70 (Fig. 9) at the lower ends of which a plurality of radial ports 71 are located. The radial ports 71 are positioned relative to a spool valve 43a and two upper spool valve ports 58a and their connecting annular groove 63a, in the same manner as the upper shoulder 66 of the embodiment of the invention illustrated in Figs. 1–7. In Fig. 9 the lower edge of the port 71 is designated by the reference number 66a to indicate this similarity.

The spool valve 43a has a generally tubular body 55a through which extends a center vertical passageway 56a into which the ports 58a lead, as well as similar ports 57a. The diameter of the spool valve body 55a is stepped down forming a high pressure annular shoulder 67a just below ports 41a in a tubular valve liner 42a, the ports 41a being aligned with ports 40a in the valve jacket 23a and thus in constant communication with the high pressure annulus 27a. A similar step down in diameter forms an upper annular shoulder 68a so located as to be constantly subjected to exhaust fluid pressure in the ports 71.

Figure 11:
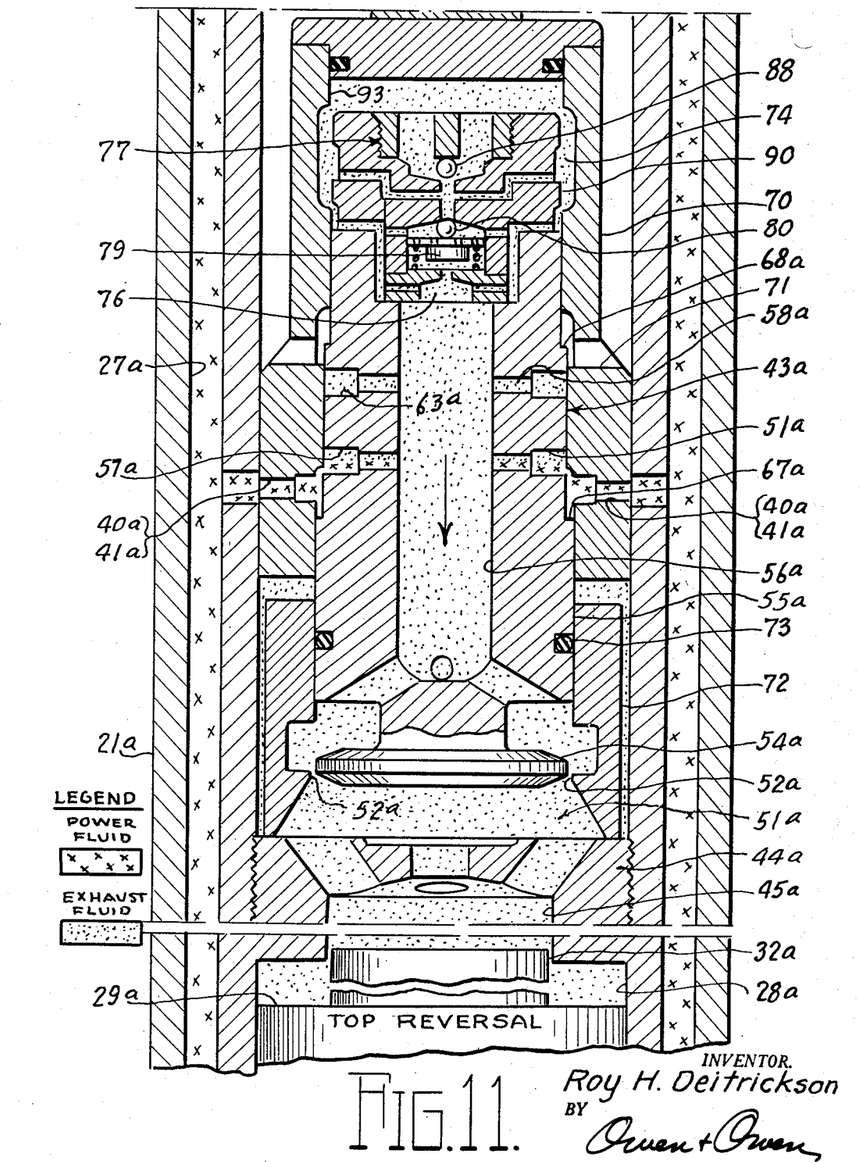
Fig. 11 is a view similar to Fig. 5 but of the embodiment of the invention illustrated in Figs. 8 and 9 at the time of a top reversal.
Figure 12:
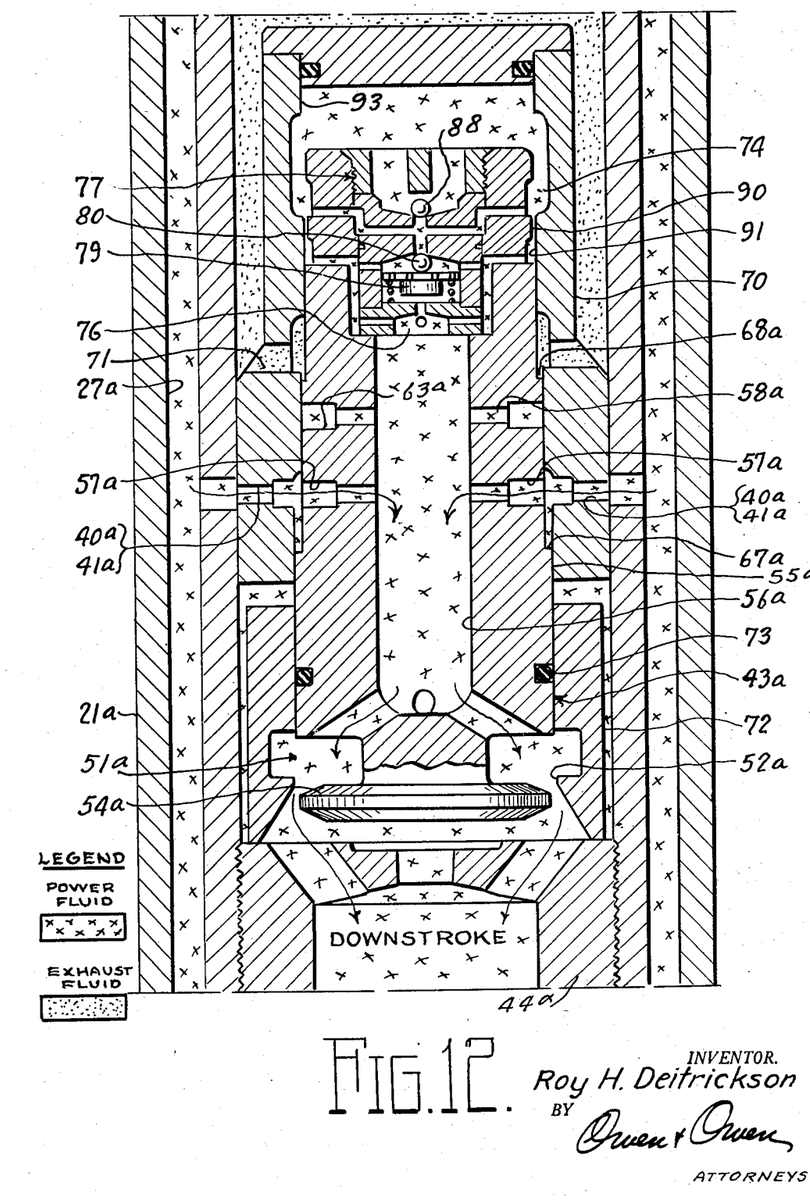
Fig. 12 is a view similar to Fig. 6, but, again, of the second embodiment of the invention, i. e., that structure illustrated in Figs. 8 and 9 during a down stroke.

At its lower end the valve spool 43a has a bulbous head 54a which is located in a lower valve chamber 51a and which cooperates with an annular land 52a on a vertically movable restrictor sleeve 72. The restrictor sleeve 72 of the instant embodiment is functionally identical with the restrictor sleeve 50 of the embodiment of the invention illustrated in Figs. 1–7 but is vertically movable for a purpose to be described below by a friction ring 74 set into the spool valve body 55a and bearing upon the inner surface of the restrictor sleeve 72. The restrictor sleeve 72 is shorter than the distance between the lower end of the valve liner 42a and the upper end of a plug 44a which defines the bottom of the lower spool valve chamber 51a and the top of an engine cylinder 28a so that the restrictor sleeve 72 moves between an upper position in contact with the lower end of the valve liner 42a (Figs. 9, 10 and 13) and a lower position in contact with the upper end of the plug 44a (Figs. 11 and 12). Like the plug 44 (Fig. 2) the plug 44a also defines an upper dashpot 45a for the reception of an upper tenon 32a (Fig. 10) on the top of an engine piston 29a.

The upper end of the valve body 55a above the annular shoulder 68a slidingly fits into the cylinder 70 at the lower portion thereof and the bore of the cylinder 70 is enlarged at its top forming a valve stem pocket 74 in which the upper end of the valve body 55a loosely fits. The upper end of the valve body 55a, i. e., that portion above the shoulder 68, is generally referred to as a valve stem 75.

The valve stem 75 has a plurality of passageways connecting the passageway 56a with the upper valve stem pocket 74. These passageways include an axial vertical passage 76 leading upwardly through the center of a valve stem plug generally indicated at 77. The passage 76 leads to a pocket 78 in which is located a spring biased plunger 79 that bears upon a ball 80 normally seated at the bottom end of a continuing axial passageway 81 in the plug 77. The plunger 79 is movable in the pocket 78 but does not interfere with the flow of liquid therethrough. Radial ports 82 connect the passage 76 with an annular space 83 surrounding the lower end of the valve stem plug 77. The space 83 communicates through radial ports 84 with the pocket 74. The passage 76 is also connected through the pocket 78 by radial ports 85 with the radial ports 84 and the pocket 74. Continuing up the valve stem plug 77, the passage 81 is connected by radial ports 86 and 87 to the pocket 74 and a second ball 88 normally is positioned to close the upper end of the passage 81. A stop block 89 in the uppermost end of the valve stem plug 77 limits the upward travel of the ball 88 and the passage 81 continues beyond the ball 88 around the block 89 to the upper end of the pocket 74.

It is thus possible for fluid to move between the passageway 56a and the pocket 74 through several alternative and/or simultaneous paths, viz.: (*a*) ports 82, space 83, port 84 and, simultaneously, passageway 76, socket 78, port 85 and port 84. (*b*) In addition, when the ball 80 is down from the position shown in Fig. 9, passage 81 and ports 86 and 87. (*c*) In addition, when the ball 88 is raised from the position shown in Fig. 9, continuation of passage 81 past stop block 89.

In Fig. 9 the spool valve 43a, valve body 55a and restrictor sleeve 72 are shown in the position which those parts assume just after a bottom reversal has caused the valve 43a to move upwardly a distance sufficient to move the restrictor sleeve 72 up against the bottom end of the valve liner 42a, but before the valve 43a has moved up enough to align the ports 58a with the ports 71 to produce an up stroke.

*Up stroke*

Figure 10:
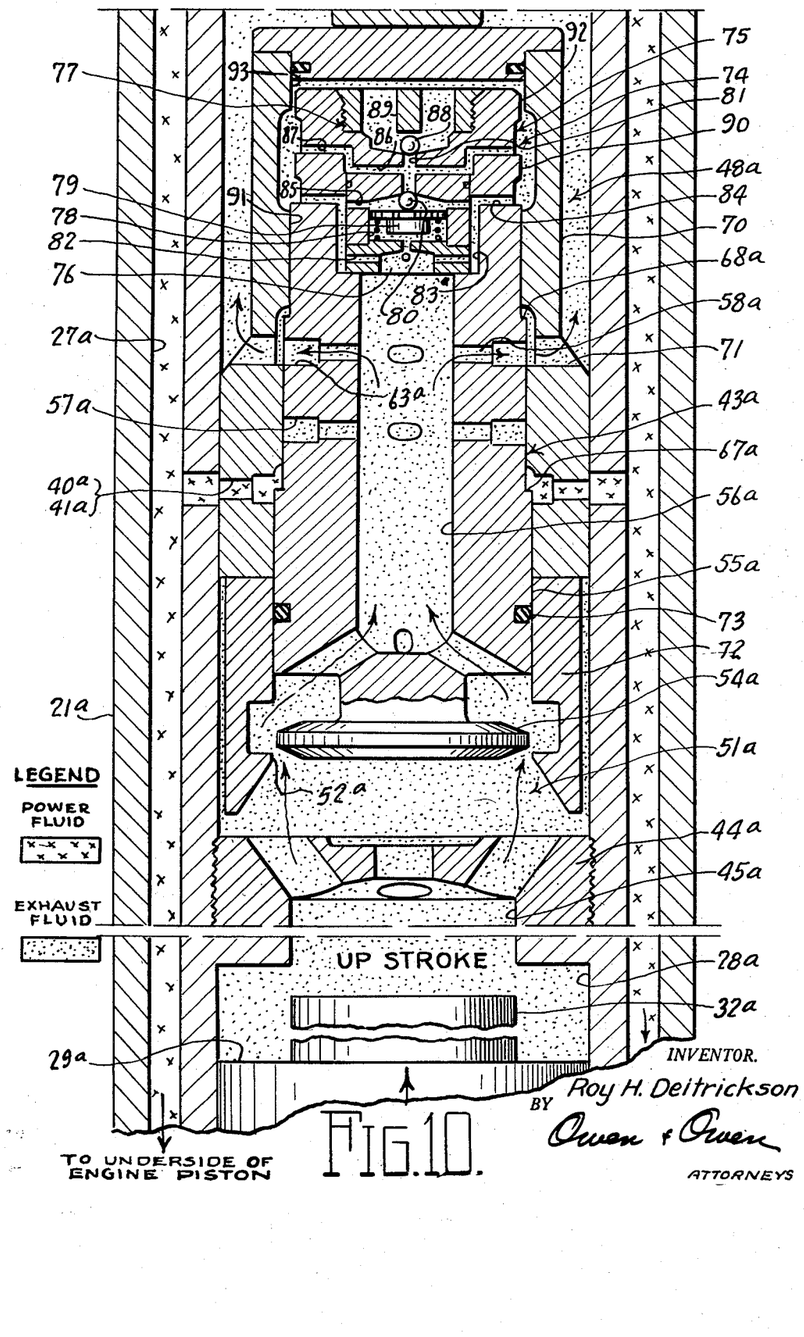
Fig. 10 is a view similar to Fig. 4 but of the embodiment of the invention illustrated in Figs. 8 and 9, showing an up stroke.

Fig. 10 illustrates the valve 43a and restrictor sleeve 72 in the up stroke position to which they move after the position shown in Fig. 9. When the valve 43a is in this uppermost position, the ports 58a are aligned with the ports 71 at the bottom of the upper valve stem chamber 48a to permit the escape of exhaust engine fluid from the space in the engine cylinder 28a above the piston 29a through the central passageway 56a of the spool valve 43a. As in the earlier described embodiment of the invention, power fluid moving down the power fluid annulus 27a to the underside of the engine piston 29a moves the piston 29a upwardly until its upper tenon 32a enters the upper dashpot 45a. During this movement, the central passageway 56a and all of the passageways and ports in the valve stem 75 and valve stem plug 77 are filled with exhaust engine fluid.

Top reversal

When the upper tenon 32a enters the upper dashpot 45a the insertion of the tenon 32a into the dashpot 45a reduces the flow of escaping fluid from above the engine piston 29a which reduces the velocity of the fluid around the spool head 54a and the pressure differential acting to hold the spool valve 43a up. When this occurs the high pressure force acting upon the annular shoulder 67a moves the valve 43a downwardly. Because of the drag of the friction ring 73 the valve body 55a carries the restrictor sleeve 72 downwardly to its lowermost position indicated in Fig. 11. This movement of the restrictor sleeve downwardly accomplishes two purposes, first it moves the land 52a downwardly to cooperate with the bulbous head 54a when the valve 43a is in its lower position. Secondly, it compensates for the displacement of fluid in the lower valve chamber 51a occasioned by movement of the valve body 55a downwardly thereinto.

Because of the influx of high pressure fluid when the ports 51a are first opened to the high pressure ports 40a—41a and high pressure fluid is admitted into the central passageway 56a, the pressure rises rapidly in the passageways in the valve stem 75 and the valve stem plug 77. This lifts the upper ball 88 from its seat and opens a pathway for the high pressure fluid through the ports 82, 85 and 84 to the valve stem pocket 74 and back through the ports 87 and 86 and through the passage 81 past the ball 88 into the upper portion of the pocket 74 above the valve stem 75. At this point the parts are in the position shown in Fig. 11.

From the position shown in Fig. 11 to fully open position the travel of the spool valve 43a downwardly is relatively slow and it only gradually opens communication between the high pressure ports 40a—41a and the ports 51a leading to the interior passage 56a of the spool valve body 55a. This reduction in speed of downward travel is under the control of a land 90 formed on the valve stem 75 which begins to close an annular space surrounding the land 90 and between it and a shoulder 91 on the walls of the valve stem cylinder 70 at the bottom of the pocket 74. Closing this pathway around the land 90 reduces the flow of fluid into the pocket 74 in the interior of the cylinder 70. Simultaneously and as the high pressure ports 51a and 40a—41a are opened the bulbous head 54a enters the narrowest restricting portion of the restrictor sleeve 52a. Further downward movement of the valve 43a finally fully inserts the land 90 into the smaller diameter portion of the cylinder 70 at the shoulder 91 restricting the flow of fluid through the port 84 to cut down the rate of flow into the pocket 74 so that the movement of the spool valve 43a downwardly continues at a slow rate of speed until it reaches its bottom-most position which it occupies during a down stroke.

Down stroke

The position of the respective parts during the down stroke is illustrated in Fig. 12 with high pressure fluid being fed through the high pressure ports 40a—41a and 51a into the interior passageway 56a of the valve 43a. Operation of the control during the down stroke is substantially identical with the operation of the control in the first embodiment of the invention described above with reference to Figs. 1–7.

Gassing on down stroke

In the case of a gas condition as described earlier, the reduction of pressure in the engine cylinder 28a above the engine piston 29a reduces the pressure differential around the head 54a and lowers the spool valve 43a to throttle the high pressure ports 40a—41a and 51a.

Any tendency of the spool valve 43a to "hunt" as a result of changes in pressure accordingly due to gassing conditions or to other variables, is throttled and virtually eliminated by the damping effect of the restricted space between the land 90 and the shoulder 91 since the spool valve 43a cannot freely move up and down unless fluid can freely flow into and out of the pocket 74. With the lower ball 80 in its normal position as illustrated in Fig. 12, the only pathway for fluid into the pocket 74 is around the land 90.

Thus under normal or other conditions the piston 29a continues to move downwardly until, as in the case of the embodiment of Figs. 1–7, it reaches the bottom of the engine cylinder and bottom reversal occurs.

Bottom reversal

Figure 13:
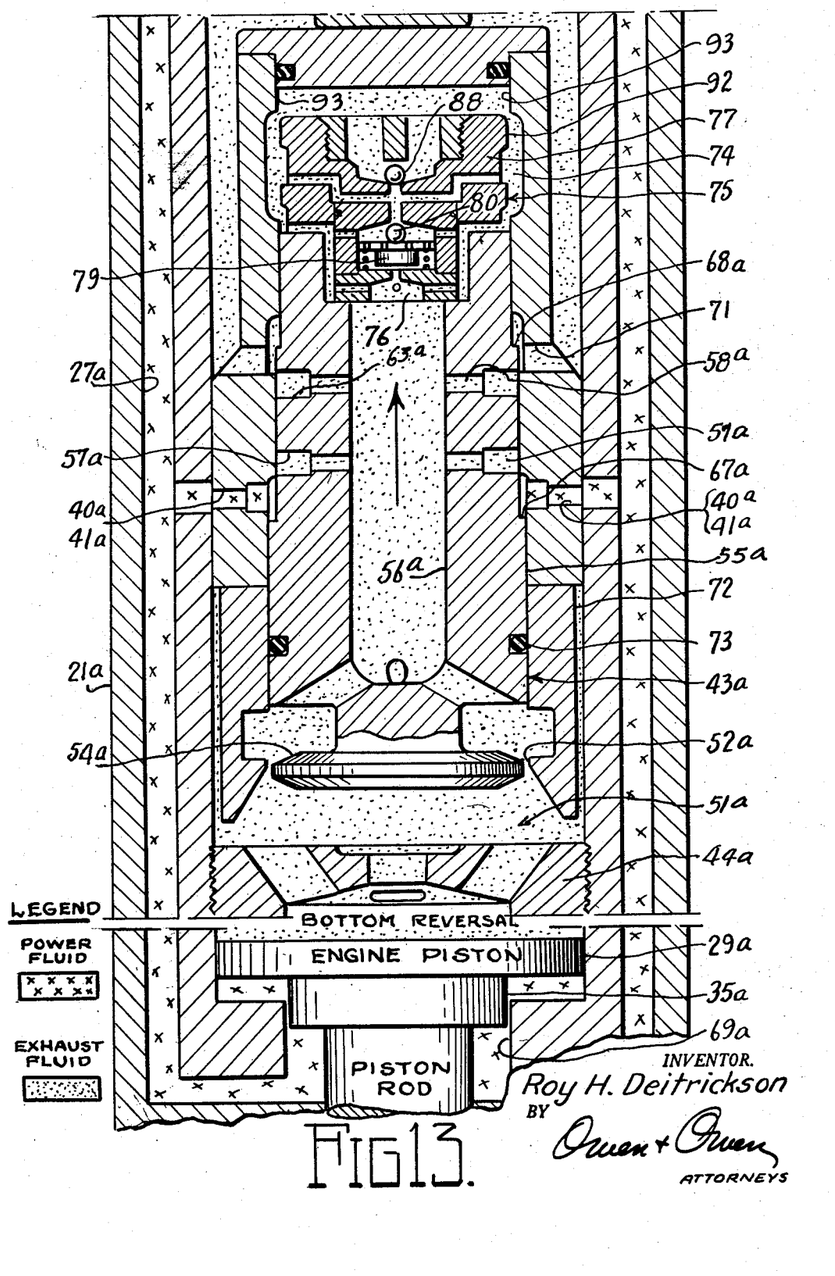
Fig. 13 is a view similar to Fig. 7 but illustrating the structure shown in Figs. 8 and 9 at bottom reversal.

When the lower tenon 35a (Fig. 13) enters the lower dashpot 69a reduction in flow of fluid from beneath the engine piston 29a builds up the fluid pressure above the engine piston 29a and, as in the case of the first embodiment of the invention, the greater pressure beneath the spool valve 43a overcomes the lesser pressure acting on the upper shoulder 68a to move the spool valve 43a upwardly. As the spool valve body 55a moves upwardly the friction ring 73 drags the restrictor sleeve 72 to its upper position (Fig. 13). This portion of the upward travel of the spool valve 43 is relatively fast because of the high pressure fluid trapped in the pocket 74 which rushes through the ports 87, 86 and passage 81 to shift the lower ball 80 downwardly opening all of the passages through the valve stem plug 77 to allow this fluid to escape.

From this point on the travel of the spool valve 43a to its fully open upper position will be slow. Since the restrictor sleeve 72 has been moved upwardly, as the head 54a moves upwardly it enters the narrowest portion of the sleeve 72 at the land 52a and also an enlarged head 92 on the uppermost end of the valve stem 75 enters a restricted portion 93 at the top of the cylinder 70. The pressure beneath the spool valve 43a pushes the valve upwardly and the restriction around the enlargement 92 prevents the rapid escape of the fluid from above the valve stem 75. When the valve 43a has moved upwardly a sufficient distance to open the escape ports 58a to the exhaust port 71 the pressure in the fluid above the engine piston 29a drops and the high pressure fluid beneath the engine piston 29a, though acting upon its smaller bottom area, moves the engine piston 29a into an up stroke.

Sanding conditions

In common with the modification of the invention described above with reference to Figs. 1–7, inclusive, entry of sand into the pump cylinder effects the appropriate reversal by a pressure action identical to that occurring at the limits of the up and down strokes.

In certain of the following claims the word "consumer" is employed to denominate the means utilizing or "consuming" the power fluid being controlled by a valve embodying the invention. The "consumer" in the specific modifications of the invention illustrated in the drawings is, of course, the engine itself, i. e., the power fluid is consumed by the engine in order to move its piston to accomplish the work done by the pump.

What I claim is:

1. In a fluid operated downwell pump comprising a pump cylinder, an engine cylinder longitudinally displaced from said pump cylinder, connected pistons operating in the respective pump and engine cylinders, said engine piston having a greater effective area on one side than on the other whereby equal operating pressures on its two faces cause movement thereof in one direction, an exhaust passage, and a source of operating fluid under pressure, the improvement comprising valve mechanism including a housing having a flow chamber located above and in constant communication with the end of said engine cylinder above said engine piston, a constantly open passageway leading from said source of operating fluid to said engine cylinder beneath said engine piston, a port in said housing to said exhaust passage, a port in said housing to said source of operating fluid, a valve in said housing for alternately connecting said ports to the upper side of said flow chamber, an operatively integral head on said valve extending down into said flow chamber, and means in said flow chamber cooperating with said head for forming a variable flow passage through said chamber for establishing a pressure differential on opposite sides of said head.

2. Mechanism according to claim 1 in which said means in said flow chamber cooperating with said head is a land on the wall of said flow chamber so located as to form with said head an annular opening variable in cross section as said valve and said head move vertically.

3. Mechanism according to claim 1 and a shoulder on said valve that is constantly under operating fluid pressure for biasing said valve toward position for connecting said source of operating fluid to said flow chamber.

4. Mechanism according to claim 3 and a second shoulder on said valve that is constantly under exhaust fluid pressure acting in the same direction as the first said shoulder.

5. Mechanism according to claim 1 in which said valve is a spool valve and there is a dashpot at the upper end of said valve, and said valve has a vertical passageway therethrough placing said flow chamber in communication with said dashpot.

6. In a fluid operated downwell pump comprising a pump cylinder, an engine cylinder longitudinally displaced from said pump cylinder, connected pistons operating in the respective pump and engine cylinders, said engine piston having a greater effective area on one side than on the other whereby equal operating pressures on its two faces cause movement thereof in one direction, an exhaust passage, and a source of operating fluid under pressure, the improvement comprising a constantly open passageway between the side of said engine cylinder beneath said engine piston and said source of operating fluid, a valve housing, ports in said housing leading to said source of operating fluid and to said exhaust passage, a flow chamber at the lower end of said valve housing and opening to said engine cylinder above said engine piston, a tubular valve in said housing slidable vertically between a position placing said source of operating fluid in communication with said flow chamber and a position placing said flow chamber in communication with said exhaust passage, a head on said valve extending into said flow chamber, and at least one land on the wall of said flow chamber and cooperating with said head to form an annular passage of variable cross section, the vertical position of said head and said valve being responsive to variations in the pressure differential in the fluid on the upper and lower faces of said head caused by flow of fluid into and out of the upper end of said engine cylinder and through said flow chamber.

7. Mechanism according to claim 6 in which said valve has an annular shoulder constantly subjected to operating fluid under pressure for biasing said valve and said head toward the lower position thereof in which said source of operating fluid is in communication with the upper end of said engine cylinder through said flow chamber.

8. Mechanism according to claim 6 in which the land on the wall of said flow chamber is formed on the inner wall of a vertically shiftable sleeve surrounding said valve and there are drag means located between said valve and said sleeve for shifting said sleeve and said land slightly in the direction of movement of said valve at the beginning of such movement.

9. Mechanism according to claim 6 in which said housing has a dashpot at the upper end of said valve and said dashpot communicates through the inner passage of said tubular valve with said flow chamber.

10. Mechanism according to claim 9 in which there are variable restrictions at the top of the center passage of said tubular valve for controlling the rate of flow of fluid between the dashpot and the inner passage of said tubular valve upon vertical movement of said valve and the upper end thereof into and out of said dashpot.

11. Mechanism according to claim 10 in which the variable restrictions are a pair of ball valves one of which opens for causing a more rapid flow of fluid into and out of said dashpot at the beginning of movement of said valve in either direction to initiate a reversal of fluid connections to the upper end of said engine cylinder above said engine piston.

12. Valve mechanism for a fluid operated downwell pump having a pump cylinder, an engine cylinder longitudinally displaced from said pump cylinder, connected pistons operating in the respective pump and engine cylinders, said engine piston having a greater effective area on one side than on the other whereby equal operating pressures on its two faces cause movement thereof in one direction, an escape passage, a source of operating fluid under pressure, and an operating fluid line constantly connected to said engine cylinder on the rod side of said engine piston, said valve mechanism comprising, a tubular valve movable between an upper position to cause flow of fluid from said engine cylinder above said engine piston to said exhaust passage and a lower position to cause flow of operating fluid from said source to said engine cylinder above said engine piston, a flow chamber above and in communication with said engine cylinder above said engine piston through which chamber fluid flows to and from said cylinder and said source and said exhaust passage, a head on the lower end of said stem, said head lying in said flow chamber, means in said flow chamber cooperating with said head to form a variable, annular orifice therein for establishing a pressure differential between opposite faces of said head, piston extensions on the top and bottom of said engine piston, associated dashpots at the top and bottom of said engine cylinder and cooperating with said piston extensions to retard the movement of said engine piston near the limits of its stroke, whereby the pressure differential on opposite faces of said head in said flow chamber is changed when said engine piston reaches the end of its stroke and causes vertical movement of said head and said valve to shift connections of said flow chamber and said engine cylinder above said engine piston between said source of operating fluid and said exhaust passage.

13. Mechanism according to claim 12 in which the means in said flow chamber which cooperates with said head is so constructed as to restrict the variable annular orifice to its smallest area in intermediate positions of said valve whereby fluctuations in the rate of flow of fluid through such variable annular orifice causes balancing movement of said head and compensating variations in such orifice.

14. In a hydraulic engine having a cylinder, a source of power fluid, a discharge, and a piston slidable in said cylinder, a reversing valve comprising, in combination, a slidable cylindrical valve body, a passageway controlled by said valve body and open when said valve body is in a first position for connecting one end of said cylinder to said source, said valve body being biased by differential pressures to move toward a second position closing said passageway, a flow chamber in said first passageway, means in said flow chamber forming a flow restriction therein, means responsive to pressure drop across said restriction for holding said valve body in such first position with said passageway open, and a second passageway controlled by said valve body and open when said valve body is in such second position for connecting said end of said cylinder to discharge.

15. A reversing valve according to claim 14 in which said valve body is axially reciprocable between the two positions, and is mounted in a tubular housing portion having annular lands forming with said body, a plurality of differential pressure areas exposed to fluid.

16. A reversing valve according to claim 14 in which the means forming a variable restriction is carried by said valve body and the means responsive to the pressure drop across said restriction comprises a part of said valve body.

17. In a hydraulic engine having a cylinder, a source of power fluid, a discharge and a piston slidable in said cylinder, a reversing valve for alternately connecting said cylinder to said source of power fluid in a first position and said cylinder to said discharge in a second position comprising, in combination, a reciprocable valve body, means for establishing a hydraulic force biasing said valve body toward the second position and having an element responsive to flow of fluid from said source of power fluid to said cylinder for holding said valve body in the first position against such bias.

18. In a hydraulic engine having a cylinder and a piston slidable therein, a reversing valve comprising, a housing, a cylindrical valve body reciprocably mounted in said housing, said body having a plurality of circumferential portions of different diameters in sealing engagement with portions of said housing, whereby said valve body and said housing form differential area surfaces on said valve body upon which pressure fluid can act, a source of fluid pressure, a passage controlled by said valve in said housing connecting said source with said cylinder above said piston, the fluid pressure from said source acting on said differential area surfaces of said valve body in a direction to move said valve to a position closing said passage, said valve body having a portion forming a restriction to the flow of fluid from said source to said cylinder whereby a pressure drop is established on said valve body acting to retain said body in a position in which the cylinder above the piston is connected to said source, and means to reduce said pressure drop whereby the valve body will move to a position in which said passage is closed.

19. A valve for controlling the flow of power fluid from a source to a consumer comprising a valve body having two alternate flow controlling positions, a passageway leading from said source to said consumer, said passageway being controlled by said valve body in its two positions, means for establishing a hydraulic force on said valve body acting in a direction tending to shift said valve body from one position to the alternate position, means cooperating with said valve body to form a restriction to the flow of fluid to the consumer and thereby to establish a hydraulic force acting on said valve body oppositely to said first named hydraulic force for maintaining said valve body in said one position whereby flow of fluid through said restriction above a predetermined rate holds said valve body in a position to direct fluid to said consumer and a reduction of such flow below the predetermined rate reduces the second named hydraulic force and the first named hydraulic force shifts said valve body to the alternate position.

20. An automatically shifting three-way valve for directing operating fluid to and from an enclosure comprising, a valve body having two alternate flow controlling positions, a source of fluid, a discharge, passageways leading from said source of said valve, from said discharge to said valve and from said enclosure to said valve, means for establishing a first hydraulic force on said valve body acting in a direction tending to shift said valve body from its first position to its second position, means cooperating with said valve body to form a restriction to the flow of fluid from said source through said valve to said enclosure when in first position and thereby establishing a second hydraulic force acting on said valve body oppositely to said first-named hydraulic force for maintaining said valve body in its first position, whereby flow of fluid through said restriction in excess of a predetermined rate holds said valve body in said first position and a reduction of said flow below the predetermined rate reduces the second-named hydraulic force and the first-named hydraulic force shifts said valve body to the second position to direct fluid from said enclosure to said discharge.

21. In a hydraulic engine having a cylinder, a source of power fluid, a discharge, and a piston slidable in said cylinder, a reversing valve comprising, in combination, a slidable cylindrical valve body, a passageway controlled by said valve body and open when said valve body is in a first position for connecting one end of said cylinder to said source, said valve body being biased by differential pressures to move toward a second position closing said passageway, means in said passageway forming a flow restriction therein, means responsive to pressure drop across said restriction for holding said valve body in said first position with said passageway open, and a second passageway controlled by said valve body and open when said valve body is in such second position for connecting said end of said cylinder to discharge.

22. In a hydraulic engine having a cylinder, a source of power fluid, a discharge, and a piston slidable in said cylinder, a reversing valve comprising, in combination, a slidable cylindrical valve body, a passageway controlled by said valve body and open when said valve body is in a first position for connecting one end of said cylinder to said discharge, said valve body being biased by differential pressures to move toward a second position closing said passageway, means in said passageway forming a flow restriction therein, means responsive to pressure drop across said restriction for holding said valve body in said first position with said passageway open, and a second passageway controlled by said valve body and open when said valve body is in such second position for connecting said end of said cylinder to source.

23. In a hydraulic engine having a cylinder, a source of power fluid, a discharge, and a piston slidable in said cylinder, a reversing valve having two opposite operative positions in one of which said cylinder is connected to said source and in the other of which said cylinder is connected to said discharge, means for establishing a hydraulic force biasing said valve towards the opposite of the positions in which it stands during operative strokes of said piston, and said valve having an element responsive to a pressure drop caused by flow of fluid into and out of said cylinder for holding said valve in position against such biasing hydraulic force, whereby said valve reverses its position and moves to an opposite position whenever said holding force is reduced by a reduction in flow below a predetermined rate.

References Cited in the file of this patent

UNITED STATES PATENTS

| 2,100,092 | Tear | Nov. 23, 1937 |
| 2,448,557 | Stephens | Sept. 7, 1948 |
| 2,541,958 | Deardorff et al. | Feb. 13, 1951 |
| 2,598,891 | Cooke | June 3, 1952 |
| 2,615,433 | Deardorff et al. | Oct. 28, 1952 |
| 2,682,257 | Deitrickson | June 29, 1954 |

FOREIGN PATENTS

| 640,642 | Great Britain | Apr. 4, 1947 |
| 992,359 | France | June 11, 1951 |